United States Patent [19]

Weiler et al.

[11] Patent Number: 5,058,714
[45] Date of Patent: Oct. 22, 1991

[54] APPARATUS FOR A DRUM BRAKE, IN PARTICULAR FOR MECHANICALLY ACTUATABLE SELF-ENERGIZING INTERNAL SHOE-TYPE DRUM BRAKES FOR AUTOMOTIVE VEHICLES

[75] Inventors: Rolf Weiler, Eppstein; Claus-Peter Panek, Steinbach; Wolfgang Endler, Hofheim; Uwe Hendrich, Mainz, all of Fed. Rep. of Germany

[73] Assignee: Alfred Teves GmbH, Frankfurt Am Main, Fed. Rep. of Germany

[21] Appl. No.: 462,516

[22] Filed: Jan. 9, 1990

[30] Foreign Application Priority Data

Jan. 12, 1989 [DE] Fed. Rep. of Germany ....... 3900740

[51] Int. Cl.$^5$ ............................................. F16D 65/52
[52] U.S. Cl. ............................ 188/196 P; 188/79.63; 188/196 C
[58] Field of Search ............... 188/79.63, 79.64, 196 B, 188/196 F, 196 D, 217, 331, 196 C

[56] References Cited

U.S. PATENT DOCUMENTS

| | | | |
|---|---|---|---|
| 2,286,711 | 6/1942 | Buffington | 188/196 B X |
| 2,476,237 | 7/1949 | Buffington | . |
| 2,889,015 | 6/1959 | White | 188/196 P |
| 2,981,379 | 4/1961 | Burrell | 188/196 P X |
| 3,090,469 | 5/1963 | Buckner | 188/196 P X |
| 3,150,746 | 9/1964 | Rumpf | 188/196 F X |
| 3,195,689 | 7/1965 | Ryskamp | 188/196 P X |
| 3,223,204 | 12/1965 | Choings | 188/196 P X |
| 3,303,908 | 2/1967 | Beirise | 188/196 P X |
| 3,870,131 | 3/1975 | Firth et al. | 188/217 X |

FOREIGN PATENT DOCUMENTS

| | | |
|---|---|---|
| 539375 | 11/1931 | Fed. Rep. of Germany . |
| 1151191 | 7/1963 | Fed. Rep. of Germany . |
| 2357377 | 5/1974 | Fed. Rep. of Germany . |
| 980482 | 12/1950 | France . |
| 1109463 | 1/1956 | France . |
| 1123266 | 6/1956 | France ............................ 188/196 P |
| 776849 | 6/1957 | United Kingdom . |
| 2116656 | 9/1983 | United Kingdom . |

Primary Examiner—Matthew C. Graham
Attorney, Agent, or Firm—J. Gordon Lewis

[57] ABSTRACT

An apparatus for a drum brake for mechanically actuatable self-energizing internal shoe-type drum brakes for automotive vehicles. A pair of brake shoes (4, 5) is arranged on a brake carrier plate (27) at a thrust member (6) and furnished with tension springs (7, 10). A mechanical actuating apparatus acts between a pair of brake shoe ends (4, 5) disposed opposite each other and prestressed by springs (7, 10). The mechanical actuating apparatus presses the brake shoes (4, 5) for braking against a brake drum (1) enclosing them and a first automatically clearance compensating adjusting device is arranged between the brake shoe ends as well as a second adjusting device arranged at at least one brake shoe web (12) supporting the brake shoe (5). In order to provide a constant functioning reliability using simple-design, and a low-cost components, while simultaneously eliminating conventional checking and adjusting operations, the adjusting device is comprised of a first adjusting apparatus with a self-adjusting, variable-length pressure strut (39) arranged between the brake shoes (4, 5) and that a second adjusting apparatus is furnished with a self-adjusting adjustment member at a brake shoe web (12) supporting the brake shoe (5), which adjustment member interacts in circumferential direction both with the mechanical actuating device (3) and with a supporting bracket (2).

30 Claims, 4 Drawing Sheets

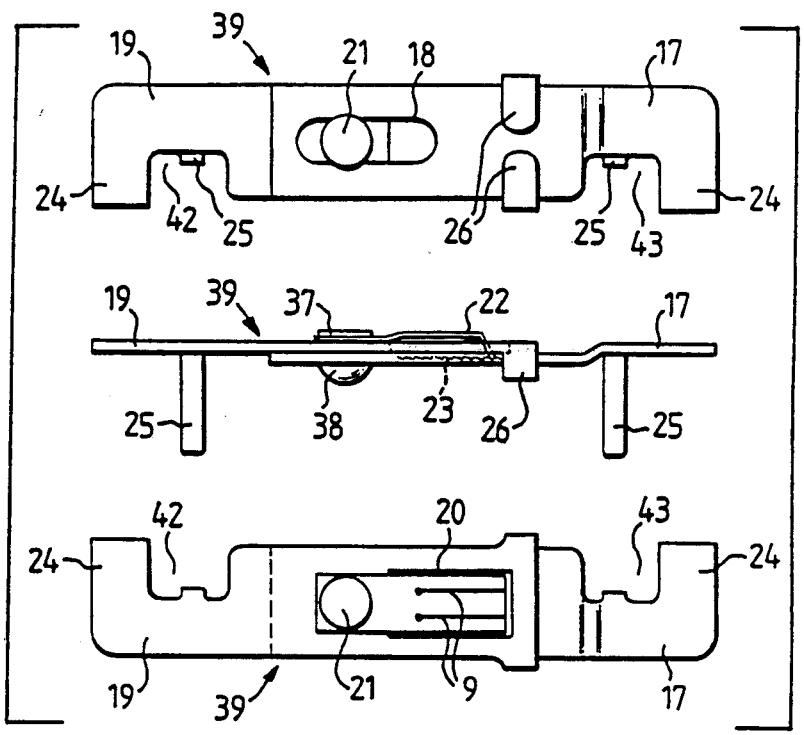
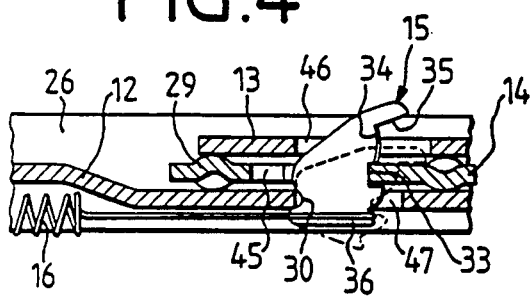
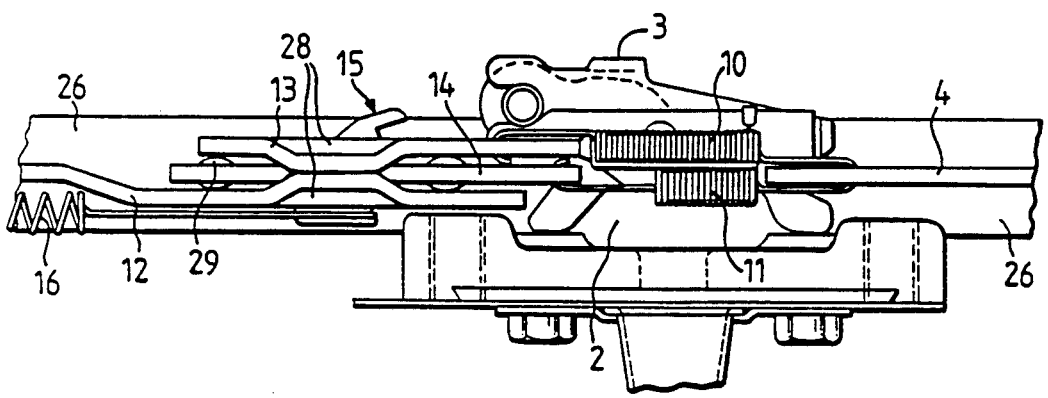

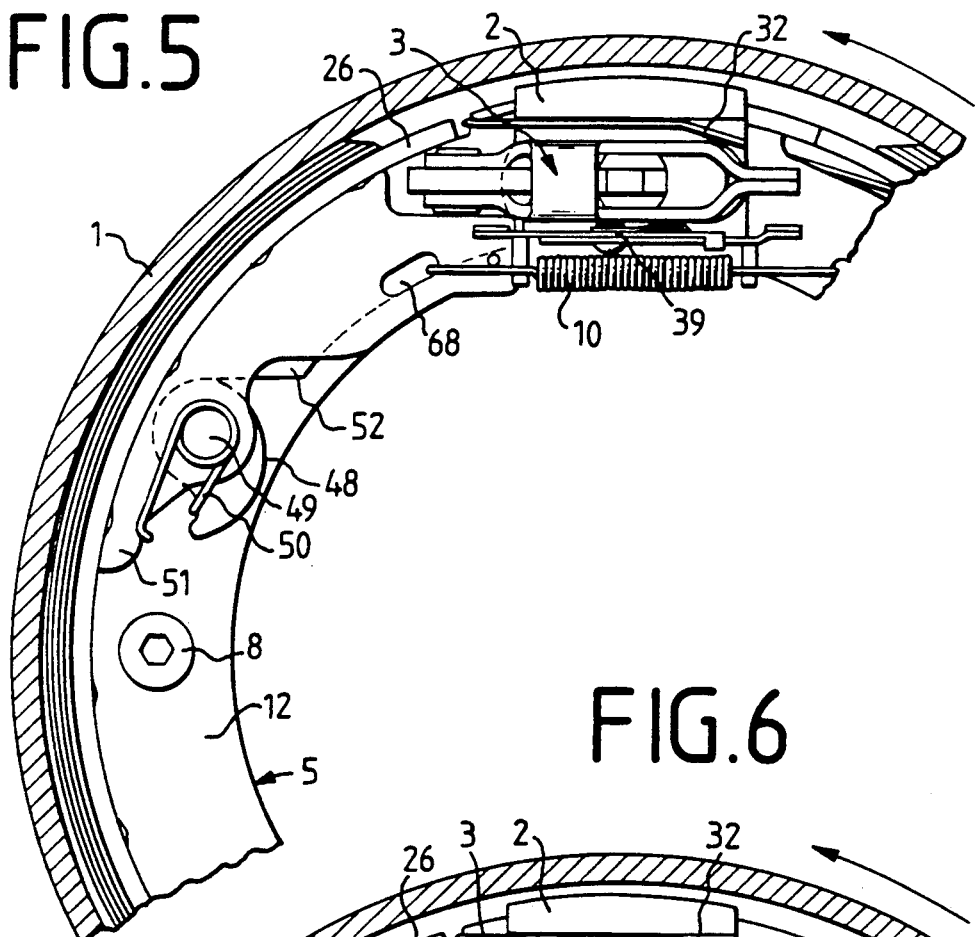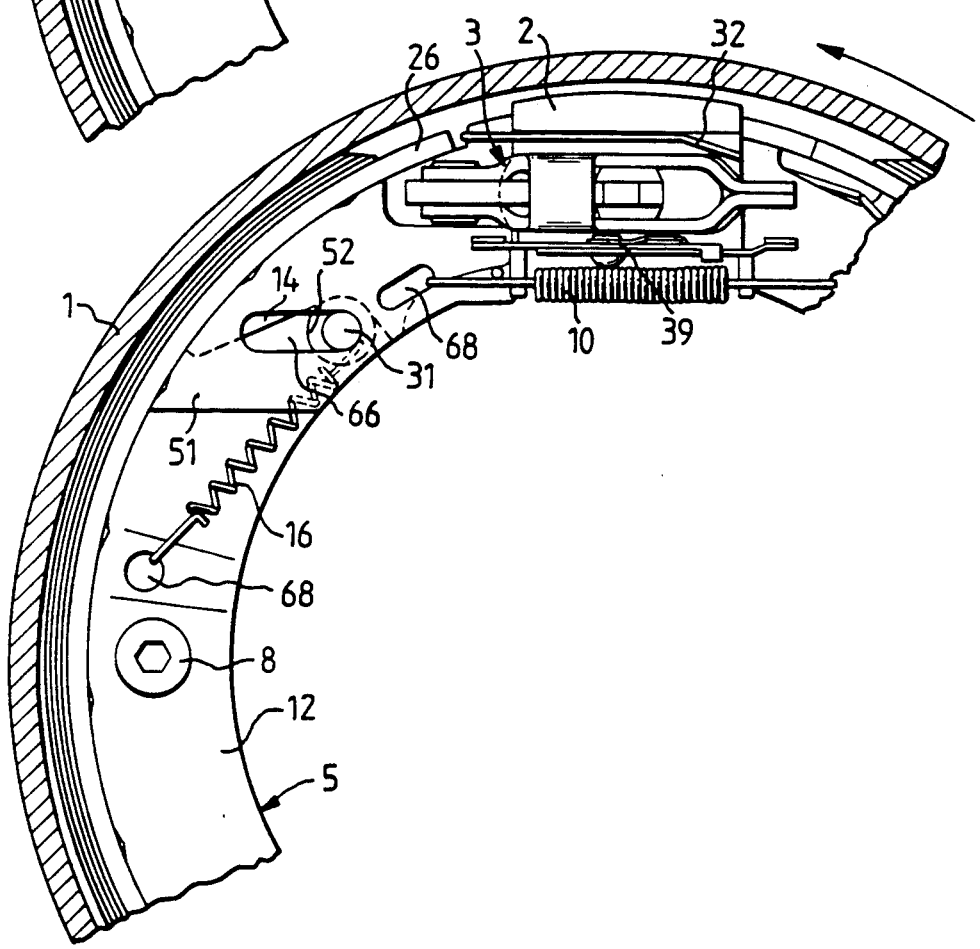

APPARATUS FOR A DRUM BRAKE, IN PARTICULAR FOR MECHANICALLY ACTUATABLE SELF-ENERGIZING INTERNAL SHOE-TYPE DRUM BRAKES FOR AUTOMOTIVE VEHICLES

BACKGROUND OF THE INVENTION

This invention relates to an apparatus for a drum brakes, for mechanically actuatable self-energizing internal shoe-type drum brakes for automotive vehicles. A pair of brake shoes are arranged on a brake carrier plate at a thrust member furnished with tension springs. A mechanical actuating apparatus acting between a pair of brake shoe ends is disposed opposite each other and is prestressed by springs. The mechanical actuating apparatus presses the brake shoes for braking against a brake drum enclosing them, and the drum brake comprises a clearance compensating adjusting apparatus arranged between the brake shoe ends and at least one brake shoe web supporting the brake shoes.

A drum brake with these features is known from the ATE Brake Handbook, Bartsch Verlag, 8th edition, page 135. In that drum brake, a mechanical actuating apparatus provided as an expanding lock is arranged on a brake carrier plate between a first pair of brake shoe ends disposed opposite each other and prestressed by springs. A second pair of the brake shoe ends touches a thrust member at an adjusting apparatus which is comprised of an adjusting nut and an adjusting screw. This adjusting apparatus has the disadvantage that additional manual adjustingly and checking operations both during mounting and during operation are required in order to maintain optimum functioning capability, since manufacturing tolerances of the components and, in particular, the wear of the linings during operation increase the clearance of the brake shoes at an inordinate extent and negatively influence the effective mechanical lever transmission of the expanding lock.

It is, therefore, an object of the present invention to provide a drum brake of the type referred to in which a constant functioning reliability is assured notwithstanding disadvantageous material and design aspects resulting from the manufacture, adjustment and application of the device.

SUMMARY OF THE INVENTION

Briefly, in accordance with the principles of the present invention, an adjusting device is integrated in a drum brake which is distinguished by a constant functional reliability independent of the manufacture thereof as a result of self-acting adjusting apparatus. In an advantageous embodiment of the present invention the adjusting member of the second adjusting apparatus is furnished, instead of a tension spring-loaded rotating key, with a torsion spring-loaded eccentric whose contact front face juxtaposed to the adjusting thrust member preferably presents a helical toothing and interacts with a similarly toothed rim of the plate-shaped adjusting thrust member. As a result of this arrangement an advantageous coupling of surfaces assisted by positive locking is provided at the contact surfaces beyond the spring-loaded friction-type locking.

It is, furthermore, envisaged according to the present invention that an adjusting member may catch at the adjusting thrust member a clamping element of wedge-shaped configuration with a pin guided in an oblong hole, in response to the effect of an adjusting tension spring and thrust member tension spring, so that a continuously variable adjustment of the adjusting thrust member takes place due to the motion of the adjusting thrust member relative to the wedge-shaped clamping element.

According to a further embodiment an eccentrically rotatable lever is coupled to the brake shoe web with a rotatable segment pivoted on the brake shoe web, so that both rotatable elements interact with each other under the force enacted by a torsion spring in the sense of a supporting action at a first section, the rotatable segment abutting against a second, geometrically shaped section at the supporting bracket.

BRIEF DESCRIPTION OF THE DRAWING

The invention may form a great variety of embodiments. Further embodiments are illustrated in the following detailed description when taken in conjunction with the following detailed description wherein:

FIG. 2 shows the inventive first adjusting apparatus scaled to 2:1, in three different views;

FIG. 3 shows the inventive second adjusting apparatus arranged at the expanding lock and supporting bracket;

FIG. 4 is a cross-sectional view of the sections of the second adjusting apparatus in FIG. 3;

FIG. 5 shows an advantageous embodiment of the second adjusting apparatus in the shape of an eccentric adjustment;

FIG. 6 shows another embodiment of the second adjusting apparatus in a top view of the inventive drum brake;

DETAILED DESCRIPTION

Figure 1:
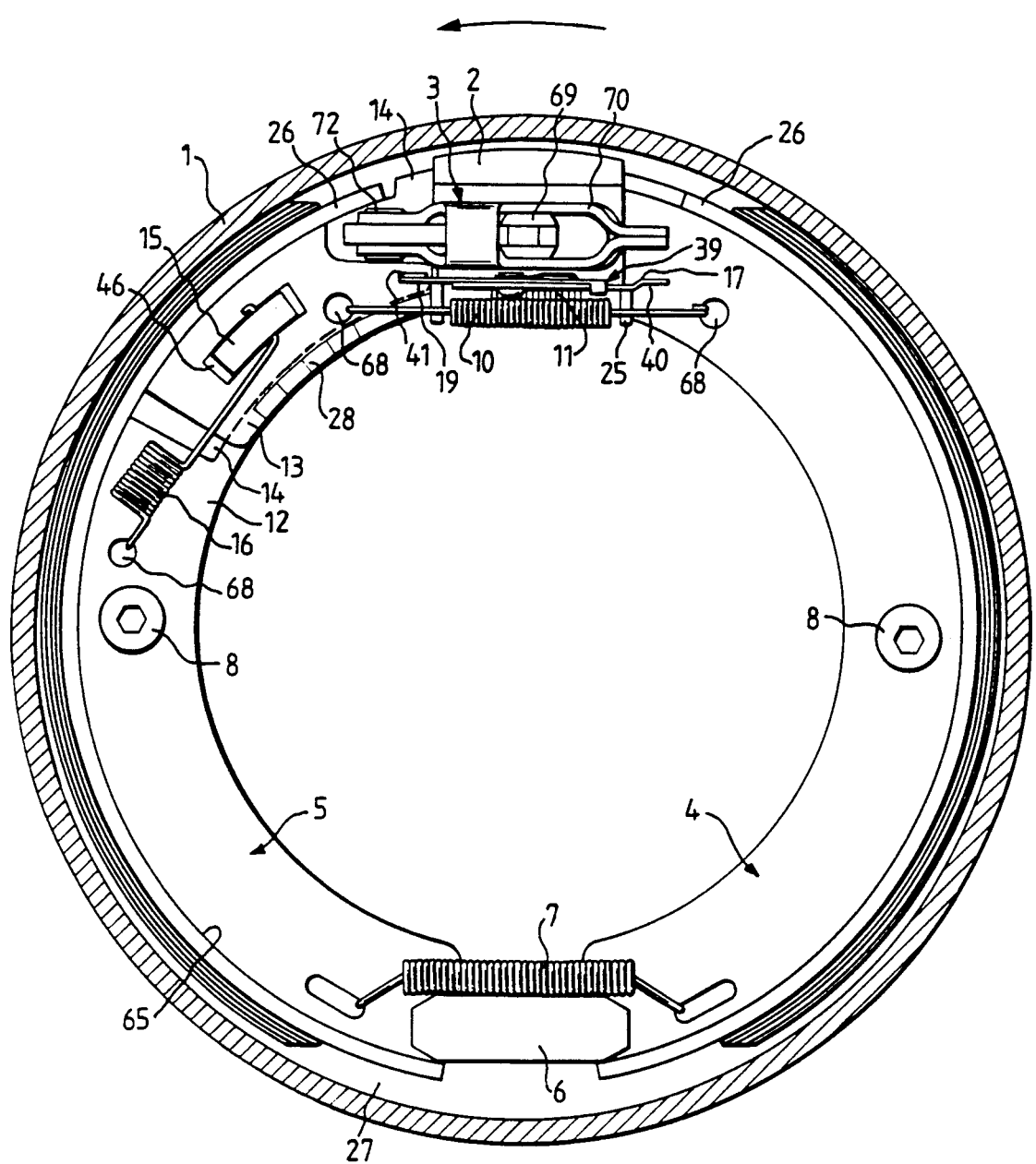
FIG. 1 shows a total view of the drum brake according to the present invention.

FIG. 1 shows a complete view of a mechanically actuatable self-energizing internal shoe-type drum brake with a pair of brake shoes 4, 5 being arranged on a brake carrier plate 27 at a thrust member 6 and furnished with a tension spring 7. The system includes a mechanical actuating apparatus designed as an expanding lock 3 which acts between a pair of brake shoe ends arranged opposite each other and prestressed by a brake shoe tension spring 10. The expanding lock 3 comprises an actuating lever 69, a thrust bracket 70, a tie cable, and a hinge bolt 72 being capable of pressing the brake shoes 4, 5 against the brake drum 1 enclosing them and shown in a sectional view after the minimum clearance is overcome by a first adjusting apparatus disposed parallel to expanding lock 3 and comprising a multiple-part, variable-length pressure strut 39 clamped between the brake shoes 4, 5. This occurs under the action of a second adjusting apparatus which touches the supporting bracket 2 at a brake shoe web 12 supporting the brake shoe 5 and presenting a rotating key 15, through an adjusting thrust member 14 being slidable in circumferential direction.

The adjusting thrust member 14 and the brake shoe webs 12, 13 are formed with openings 45, 46, 47 which extend in tangential direction with respect to the center of the drum brake and into which the rotating key 15 is guided radially by the adjusting thrust member 14 and swivelled about its fulcrum against the adjusting thrust member 14 by an adjusting tension spring 16. In the direction toward the thrust member 6 and toward the expanding lock 3, the brake shoes 4, 5 are retained by the tension springs 7, 10. The pressure strut 39 is arranged in the shape of a two-part stamping engaging the cutouts 40, 41 at the web segment 13 and at the brake shoe web 12 is retained by a brake shoe tension spring 10 juxtaposed to the guide tongues 25. The brake shoe 5 accommodates on its brake shoe web 12 the second adjusting apparatus comprising the rotating key 15, the adjusting thrust member 14 and the adjusting tension spring 16. Between the brake shoe web 12 and the web segment 13, the thrust member 14 is inserted to be slidable in circumferential direction against the supporting bracket 2 and the expanding lock 3, the radial guidance of the thrust member 14 being ensured by the inner side of the lining carrier plate 65 and the dimple 28 at the margin of the brake shoe web 12. The brake shoe retainers 8 provide a parallel alignment of the brake shoes 4, 5 in respect to the brake carrier plate 27.

FIG. 2 shows a first adjusting apparatus in accordance with the present invention in an upscaled representation in three different angles of view, wherein it is apparent that the pressure strut 39 comprises two plates 17, 19 which are preferably fabricated by stamping with guide elements 26 arranged laterally at a first plate 19 and enclosing the second plate 17 in longitudinal direction. The plate 17 which is stamped out of a piece of sheet steel or plate steel is formed with an oblong hole 18 in longitudinal direction which guides the stem of a rivet pin secured to the plate 19, so that both plates 17, 19 are clamped by the swage-head 37 and the closing head 38 of the rivet pin to allow a variation of their length. The rivet pin secures a leaf spring 22 whose bent-off end engages a transverse toothing 23 provided on the plate 17 through a cutout 20 made by stamping in the direction of slide of the plate 19. In the direction of tearing apart of the plates 17, 19 the individual teeth of the transverse toothing 23 and of the leaf spring 22 have an essentially identical angular position, as a result of which the toothing smoothly slips one over the other, but in the direction of pressing together of the plates 17, 19 a blocking actions is effective, so that the pressure strut 39 ensures an adjusting action spreading apart the brake shoes 4, 5 and, thus, does not allow an automatic reset. For the purpose of supporting or of securing the pressure strut 39 at the brake shoes 4, 5, both plates 17, 19 are arranged at their ends in the shape of hooked webs 24 which engage cutouts 40, 41 in the surface of the brake shoe web. Due to the hook-shaped webs 24 at the ends of the pressure strut 39 tapers are formed in which rectangular, bent-off guide tongues 25 at the plates 17, 19 remain to support the pressure strut 39 at the brake shoes 4, 5.

The pressure strut 39 acts as a component of the first adjusting apparatus exclusively as an expansion adjusting means, since as a result of the extractably configurated plates 17, 19 the brake shoes 4, 5 are expanded in case of wear of the lining in order to ensure a nearly constant clearance and, as a result, constant functioning conditions of the drum brake.

FIG. 3 illustrates the structure of a second adjusting apparatus of the drum brake in accordance with the present invention in a representation as a part-sectional view of FIG. 1. FIG. 3 illustrates that parallel to the brake shoe tension spring 10 an adjusting tension spring 11 is suspended in an opening at the end of the plate-shaped adjusting thrust member 14. The adjusting tension spring 11 brings the adjusting thrust member 14 into abutment against the supporting bracket 2, only partially shown in FIG. 3, under the action of a tensile force. The brake shoe web 12 and the web segment 13 are preferably connected to each other by spot welds at their dimples 28 disposed at the margins of the surfaces of both parts, the interposed adjustingly thrust member 14 and the rotating key 15 being arranged slidably, respectively swivelably in openings 45, 46, 47, not shown in detail in FIG. 3.

FIG. 4 shows the adjusting thrust member 14 being slidable in parallel direction between the adjacent brake shoe web 12 illustrated in a sectional view and the web segment 13, and the rotating key 15 which is swivelably supported in the opening 46 of the brake shoe web 12 and which points in the direction of the adjusting thrust member 14 about the swivel bearing 30 under the action of the rotating key tension spring 16. In this configuration, the curvature 34 is locked during the motion of adjustment in the rectangular opening 45 of the adjusting thrust member 14 until the limit stop 35 strikes against the lateral surface of the adjusting thrust member 14 after having performed the maximum adjustment strike at the adjusting thrust member 14.

In order to accommodate the motion of adjustment of the adjusting thrust member 14, the adjusting thrust member 14 is formed with bulges 29 at both of its lateral surfaces which afford a punctual, rust and friction-minimized surface of contact with the adjacent web segment 13 and the brake shoe web 12.

The second adjusting apparatus described in FIGS. 3 and 4 essentially comprises the adjusting thrust member 14, the rotating key 15 and the rotating key spring 16 which acts as a means of adjustment of the abutment of the brake shoe 5 with the supporting brake 2 in order to compensate the clearance which forms between the leading-side brake shoe 5 and the supporting bracket 2 as a result of the expansion adjustment of the first adjusting apparatus.

The embodiment of the second adjusting apparatus at the brake shoe 5 shown in sections in FIG. 5 presents the torsion spring-loaded eccentric 48 which touches with its toothed front face arranged as a curved path the toothed end of the adjusting thrust member 14 being slidable in circumferential direction. The eccentric 48 is pivoted on the pin 49 between the brake shoe web 12 and the supporting web 51, the torsion spring 50 plugged on the pin 49 being in abutment against the supporting web 51 with its one end and transmitting the spring prestressing power to the eccentric 48 with its other end, so that the adjusting thrust member 14 moves against the supporting bracket 2 under the action of the tension spring 32 being retained at the supporting bracket 2 and at the adjusting thrust member 14.

FIG. 6 shows a further embodiment of the second adjusting apparatus in which in longitudinal openings 66, 67, are parallel to each other in alignment one behind the other in the drawing plane of the sheet between the brake shoe web 12 and the supporting web 51. The clamping element 52 is guided slidable in the direction of the expansion of the brake shoes 4, 5 and whose bolt-shaped body is knurled on the surface area in order to realize a safe engagement at the end of the adjusting thrust member 14. Studs 31 are disposed on either side of the bolt which are guided essentially without play in the longitudinal openings 66, 67. Due to the rotating key tension spring 16 which is suspended both at the stud 31 and in the spring accommodating means 68, the clamping element 52 urges with its bolt against the wedge-shaped end of the adjusting thrust member 14, so that a permanent friction-type locking is provided at the wedge-shaped end of the adjusting thrust member 14 for the purpose of conserving the momentary adjustment position. The slide of the adjusting thrust member 14 at the supporting bracket 2 takes place by means of the tension spring 32.

Figure 7:
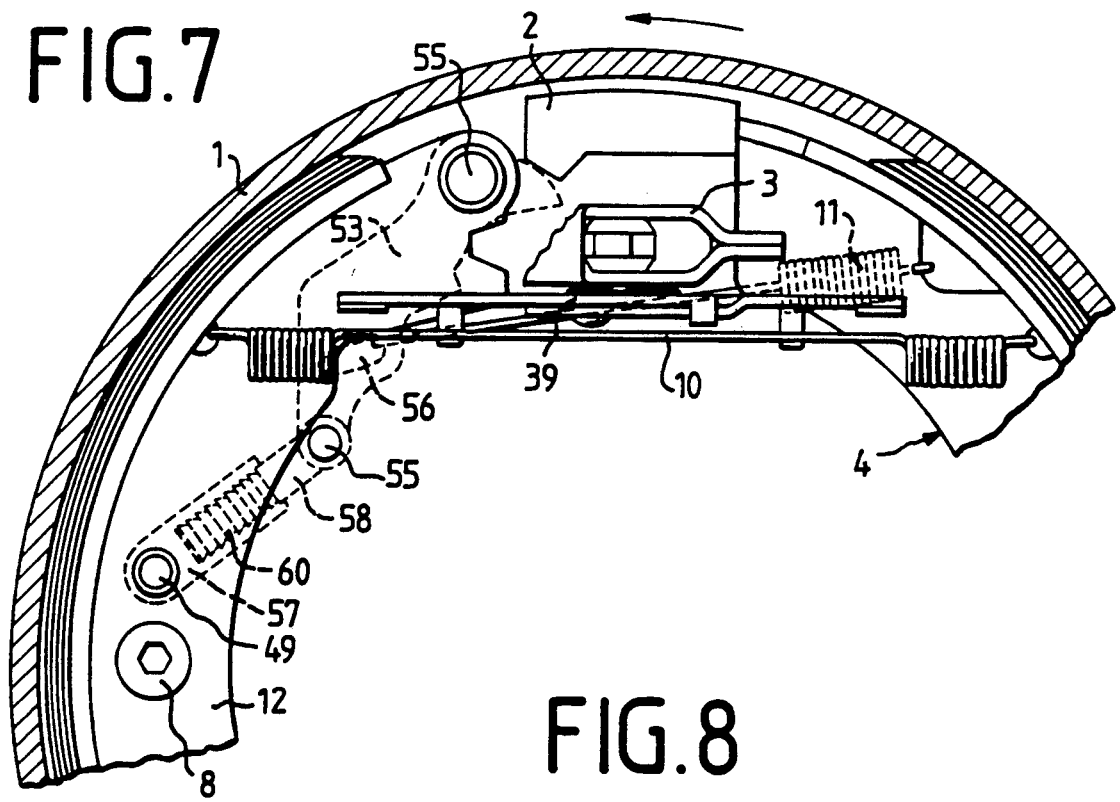
FIG. 7 shows a favorable embodiment of the second adjusting apparatus in the shape of a combination of a rotatable segment, a bushing and a threaded pin.

A further embodiment of the second adjusting apparatus at the brake shoe 5 is illustrated in FIG. 7 according to which the bushing element 57 which is rotatably secured to the pin 49 is furnished with a buttress thread 60 in its hollow space interacting with a threaded bolt 58 and is coupled to a bearing bolt 55. As a result, the rotating segment 53 is retained in its position at the supporting bracket 2. Upon the expansion of the brake shoes 4, 5, the rotating segment 53 is adjusted by the tensile force of the adjusting tension spring 11 until it comes to touch the supporting bracket 2, so that the adjusting apparatus remains in its new position according to the spacing of the teeth of the buttress thread 60. For the purpose of sliding and of locking of the threaded bolt 58, the bushing element 57 is slotted in the direction of movement in order to render an expansion of the bushing element 57 with subsequent locking of the threaded bolt 58.

Figure 8:
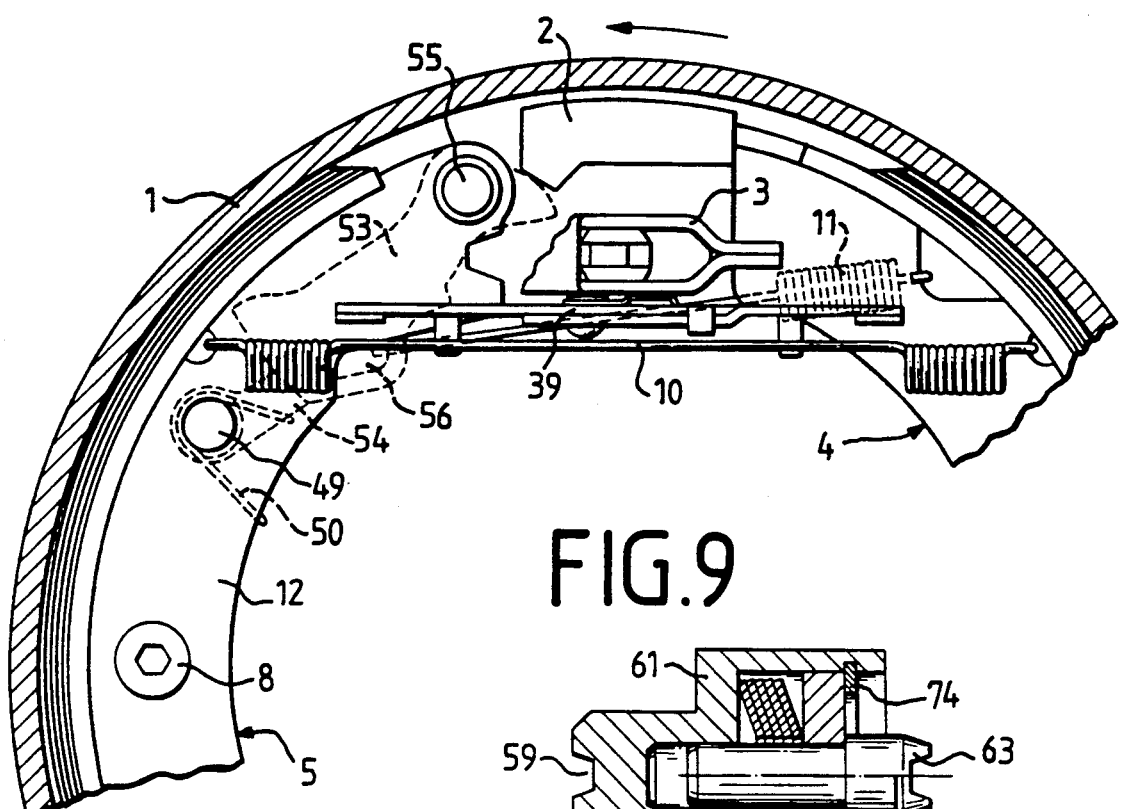
FIG. 8 shows the second adjusting apparatus in the shape of a combination of a rotatable segment and a clamping lever.

FIG. 8 shows the adjustment method of a clamping lever locking. A rotating segment 53 pivoted on a bolt 55 takes support at a clamping lever 54 whose lever arm extends out of axis with respect to the center line of the pin 49, clamping lever 54 constantly is maintained in engagement with the rotating segment 53 by the action of the torsion spring 50 at the pin 49. When the rotating segment 53 is swivelled in the direction of adjustment, the contact surface of the two components is relieved and the rotating segment 53 continues its swivelling motion until it abuts against the supporting bracket 2. When a resetting of the rotating segment 53 is attempted, the latter will clamp with the clamping lever 54 as a result of the elastic force of the torsion spring 50, so that a rigid locking bridging of force results. The contact surface between the rotating segment 53 and the clamping lever 54 is knurled or toothed in order to improve the clamping effect.

Figure 9:
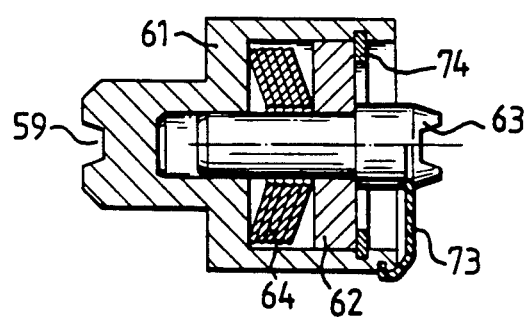
FIG. 9 is a longitudinal section of the inventive adjusting unit integrated in the thrust member.

FIG. 9 shows the thrust member 6 in the shape of a unilaterally open hollow body with a spring-loaded and axially slidable pressure disc 62 accommodated therein which receives the thrust pin 63. Accordingly, one brake shoe end takes elastically support at the thrust pin 63, while the other brake shoe end is in abutment against an accommodating means 59 rigidly formed at the closed side of the thrust member. In this configuration, the spring force of the selected compression spring 64 which acts through the pressure disc 62 on the thrust pin 63 is sized higher than the brake actuating power which has to be transmitted from the brake shoe 5 to the thrust member 6. On the other hand, the spring force of the compression spring 64 must remain lower than the tension force of the brake drum which leads to plastic deformation, in order to prevent material damages, on one side, and to offer a regular release of the brake shoes under the effect of the shrinking tension on account of the cooling of the brake drum 1 upon the end of the braking action, on the other side. The hollow space of the housing 61 is sealed off against the penetration of moisture by a protecting cap 73 which closes the thrust pin 63 and the opening of the housing 61. A circlip 74 is inserted in a groove of the housing 61 prevents the pressure disc 62 from being unintentionally pushed out of the housing guide and retains the pressure disc 62 in its prestressed position.

What is claimed is:

1. An apparatus for a drum brake for mechanically actuatable self-energizing internal shoe-type drum brakes for automotive vehicles, comprising a pair of brake shoes arranged on a brake carrier plate at a thrust member and furnished with tension springs, a mechanical actuating apparatus acting between a pair of brake shoe ends disposed opposite each other and prestressed by springs, said mechanical actuating apparatus pressing the brake shoes for braking against a brake drum enclosing them and the drum brake comprising a clearance compensating adjusting device arranged between the brake shoe ends, at least one brake shoe web supporting the brake shoe, wherein said adjusting device consists of a first adjusting apparatus with a multiple-part, self-adjusting, variable-length pressure strut (39) arranged between the brake shoes (4, 5) and wherein a second adjusting apparatus is provided between the at least one brake shoe web (12) and a brake shoe web portion supporting said brake shoe (5) with a self-adjusting adjustment member which interacts in the circumferential direction both with said mechanical actuating apparatus (3) and with a cooperating supporting bracket (2) wherein said brake shoe web (12) is automatically lengthened so that said mechanical actuating apparatus (3) consistently assumes a substantially constant starting point.

2. An apparatus as claimed in claim 1, wherein two plates (17, 19) which are arranged parallel on on top of the other form said pressure strut (39), the profile of said plates (17, 19) having a rectangular shape and guide elements (26) being arranged at the longitudinal sides of said rectangular basic profile.

3. An apparatus for a drum brake as claimed in claim 1 wherein two plates (17, 19) guided in parallel are provided and arranged flush one on top of the other transversely in respect of the sliding direction, a guide pin (21) being secured on the sliding surface of the first said plate (19) whose stem is guided in an oblong hole (18) of the second plate (17).

4. An apparatus for a drum brake for mechanically actuatable self-energizing internal shoe-type drum brakes for automotive vehicles, comprising a pair of brake shoes arranged on a brake carrier plate at a thrust member and furnished with tension springs, a mechanical actuating apparatus acting between a pair of brake shoe ends disposed opposite each other and prestressed by springs, said mechanical actuating apparatus pressing the brake shoes for braking against a brake drum enclosing them and the drum brake comprising a clearance compensating adjusting device arranged between the brake shoe ends, at least one brake shoe web supporting the brake shoe, wherein said adjusting device consists of a first adjusting apparatus with a multiple-part, self-adjusting, variable-length pressure strut (39) arranged between the brake shoes (4, 5) and wherein a second adjusting apparatus is provided at a brake shoe web (12) supporting said brake shoe (5) with a self-adjusting adjustment member which interacts in the circumferential direction both with said mechanical actuating apparatus (3) and with a supporting bracket (2) wherein first and second plates (17, 19) guided in parallel are provided and arranged flush one on top of the other transversely in respect of the sliding direction, a guide pin (21) being secured on the sliding surface of the first said plate (19) whose stem is guided in an oblong hole (18) of the second plate (17), and, wherein said guide pin (21) is a rivet pin whose stem is slidable in said oblong hole (18) of said second plate (17) and is bounded by a closing head (38) and a swage-head (37), a leaf spring (22) being clamped between said swage-head (37) and the first said plate (19) whose end is bent off and pointing toward said plate (17) in the direction of adjustment engages a transverse toothing (23) arranged on the sliding surface of the second plate (17) through a cutout (20) of the first plate (19).

5. An apparatus for a drum brake as claimed in claim 4 wherein the surface of said transverse toothing (23) has a saw tooth-shaped configuration, the saw tooth profile with the tooth face having a blocking effect preferably at a right angle in the direction of adjustment, while the tooth back opposed to the direction of adjustment forms an obtuse angle with said leaf spring (22).

6. An apparatus for a drum brake as claimed in claim 5, wherein said multiple-part pressure strut (39) is furnished at its end surfaces with hook-shaped webs (24) which engage cutouts (40, 41) of said brake shoes (4, 5), the length of said cutouts (40, 41) being larger than the width of said engaging webs (24).

7. An apparatus for a drum brake as claimed in claim 6, wherein recesses (42, 43) guide tongues (25) bent off at a right angle are provided in supporting abutment in parallel against said brake shoe web (13).

8. An apparatus for a drum brake as claimed in claim 6, wherein said second plate (17) of said pressure strut (39) is enclosed by said guide elements (26) of said first plate (19).

9. An apparatus for a drum brake as claimed in claim 6, wherein said guide elements (26) enclose said second plate (17) in a U-shaped manner.

10. An apparatus for a drum brake as claimed in claim 9, wherein longitudinal slots (9) are provided in said leaf spring (22).

11. An apparatus for a drum brake as claimed in claim 9, wherein the adjusting member of the said second adjusting apparatus at the brake shoe (5) is represented by a rotating key (15) arranged eccentrically in respect of the fulcrum of a swivel bearing (30), having a toothed curvature (34), a limit stop (35) and a sparing (33) adapted to the shape of the adjusting thrust member (14) and at whose adjacent lever section (36) a rotating key tension spring (16) is suspended with one spring end, while the opposite spring end engages a spring accommodating means (68) of said brake shoe web (12).

12. An apparatus for a drum brake as claimed in claim 9, wherein under the action of said rotating key tension spring (16) said rotating key (15) is supported with its said swivel bearing (30) at a tangential distance from the center line of the drum brake in an opening (47) in said brake shoe web (12) and touches said adjusting thrust member (14) at said sparing (33).

13. An apparatus for a drum brake as claimed in claim 12, wherein said adjusting thrust member (14) is formed with small-area bulges (29) which guide between said brake shoe web (12) and a web section (13) said adjusting thrust member (14) slidable in circumferential direction.

14. An apparatus for a drum brake as claimed in claim 13, wherein said bulges (29) rolling bodies are inserted and guided in their rolling motion by the juxtaposed lateral surfaces of said brake shoe web (12) and said web segment (13).

15. An apparatus for a brake unit as claimed in claim 14, wherein said adjusting thrust member (94) is guided in radial direction by an inner side (65) of the lining carrier and by radially opposed dimples (28) of the web steel plate or steel sheet comprising said brake shoe web (12) and said web segment (13).

16. An apparatus for a drum brake as claimed in claim 15, wherein said rotating key (15) is swivelably secured by openings (47, 46, 45) in said web section (13), in said brake shoe web (12) and in said adjusting thrust member (14) and is radially guided in said opening (45) of said adjusting thrust member (14).

17. An apparatus for a drum brake as claimed in claim 16, wherein said web segment (13) and said brake shoe web (12) are stationarily coupled at their radially external margin to the lining carrier plate (26) which bears the brake lining and at said dimples (28) by means of spot welding.

18. An apparatus for a drum brake as claimed in claim 17, wherein under the action of an adjusting spring (11) suspended in a bore of said thrust member (14) and generating tensile force, said adjusting thrust member (14) touches the stop of said supporting bracket (2) with its surface facing said supporting bracket (2).

19. An apparatus for a drum brake as claimed in claim 18, wherein said adjusting spring (11) is arranged in parallel position in respect of the brake shoe tension spring (10) and they jointly engage a spring accommodating means of said brake shoe (4), said brake shoe tension spring (10) bounding said guide tongues (25) of said pressure strut (39).

20. An apparatus for a drum brake, in particular for mechanically actuatable self-energizing internal shoe-type drum brakes for automotive vehicles, with a pair of brake shoes arranged on a brake carrier plate at an adjusting thrust member and furnished with tension springs, a mechanical actuating apparatus acting between a pair of brake shoe ends disposed opposite each other and being prestressed by springs, said mechanical actuating apparatus being capable of pressing the brake shoes for braking against a brake drum enclosing them and a first automatically clearance compensating adjusting device arranged between the brake shoe ends and a second such adjusting device arranged at at least one brake shoe web supporting the brake shoe, wherein the adjusting member of said second adjusting apparatus at said brake shoe (5) comprises a torsion spring-loaded eccentric (48) which touches a toothed front face provided with logarithmic curvature on the toothed end of said adjusting thrust member (14) being slidable in circumferential direction wherein said second adjusting device automatically lengthens the position of said brake shoe web.

21. An apparatus for a drum brake for mechanically actuatable self-energizing internal shoe-type drum brakes for automotive vehicles, with a pair of brake shoes arranged on a brake carrier plate at a thrust member and furnished with tension springs, a mechanical actuating apparatus acting between a pair of brake shoe ends being disposed opposite each other and being prestressed by springs, said mechanical actuating apparatus being capable of pressing the brake shoes for braking against a brake drum enclosing them and a first automatically clearance compensating adjusting device arranged between the brake shoe ends as well as a second such adjusting device arranged at at least one brake shoe web supporting the brake shoe, wherein at least one of said torsion spring (50) wound around a pin (49) and whose first end is supported at a supporting web (51) and whose second end is supported at said eccentric (48) which swings an eccentric member (48) in the direction of said adjusting thrust member (14) and wherein under the effect of a friction-type locking one of said tension spring (32) is disposed at said supporting bracket (2) and at said adjusting thrust member (14) brings said adjusting thrust member (14) which is slidable in circumferential direction in contact with a supporting bracket (2) wherein said second adjusting device automatically lengthens the position of said brake shoe web.

22. An apparatus for a drum brake for mechanically actuatable self-energizing internal shoe-type drum brakes for automotive vehicles, with a pair of brake shoes arranged on a brake carrier plate at a thrust member and furnished with tension springs, a mechanical actuating apparatus acting between a pair of brake shoe ends being disposed opposite each other and being prestressed by springs, said mechanical actuating apparatus pressing the brake shoes for braking against a brake drum enclosing them and a first automatically clearance compensating adjusting device arranged between the brake shoe ends and a second adjusting device arranged at at least one brake shoe web supporting the brake shoe, wherein said pin (49) receives an eccentric (48) in the shape of a pivot bearing and wherein it is stationarily arranged between said brake shoe web (12) and a supporting web (51) wherein said second adjusting device automatically adjusts the position of said brake shoe web.

23. An apparatus for a drum brake for mechanically actuatable self-energizing internal shoe-type drum brakes for automotive vehicles, with a pair of brake shoes arranged on a brake carrier plate at a thrust member and furnished with tension springs, a mechanical actuating apparatus acting between a pair of brake shoe ends being disposed opposite each other and being prestressed by springs, said mechanical actuating apparatus pressing the brake shoes for braking against a brake drum enclosing them and a first automatically clearance compensating adjusting device arranged between the brake shoe ends and a second adjusting device arranged at at least one brake shoe web supporting the brake shoe, wherein the spring prestressing force of said brake shoe tension spring (10) is higher than that of of an adjusting tension spring (11) wherein said second adjusting device automatically adjusts the position of said brake shoe web.

24. An apparatus for a drum brake for mechanically actuatable self-energizing internal shoe-type drum brakes for automotive vehicles, with a pair of brake shoes arranged on a brake carrier plate at a cooperating thrust member and furnished with tension springs, a mechanical actuating apparatus acting between a pair of brake shoe ends being disposed opposite each other and being prestressed by springs, said mechanical actuating apparatus pressing the brake shoes for braking against a brake drum enclosing them and a first automatically clearance compensating adjusting device arranged between the brake shoe ends and a second adjusting device arranged at at least one brake shoe web supporting the brake shoe, wherein in longitudinal openings (66, 67) between said brake shoe web (12) and said supporting web (51) a clamping element (52) is guided which is slidable in said longitudinal openings (66, 67) in the direction of expansion of the said brake shoes (4, 5) and whose bolt-shaped body is knurled on the surface area, said knurling interacting with the one end of said thrust member (14) wherein said second adjusting device automatically adjusts the position of said brake shoe web.

25. An apparatus for a drum brake for mechanically actuatable self-energizing internal shoe-type drum brakes for automotive vehicles, with a pair of brake shoes arranged on a brake carrier plate at a thrust member and furnished with tension springs, a mechanical actuating apparatus acting between a pair of brake shoe ends being disposed opposite each other and being prestressed by springs, said mechanical actuating apparatus pressing the brake shoes for braking against a brake drum enclosing them and a first automatically clearance compensating adjusting device arranged between the brake shoe ends and a second adjusting device arranged at at least one brake shoe web supporting the brake shoe, wherein a slidable clamping element (52) is provided as a plate wedge-shaped in the direction of adjustment and is guided in said longitudinal openings (66, 67) by means of studs (31) arranged on either side thereof wherein said second adjusting device automatically adjusts the position of said brake shoe web.

26. An apparatus for a drum brake for mechanically actuatable self-energizing internal shoe-type drum brakes for automotive vehicles, with a pair of brake shoes arranged on a brake carrier plate at a thrust member and furnished with tension springs, a mechanical actuating apparatus acting between a pair of brake shoe ends being disposed opposite each other and being prestressed by springs, said mechanical actuating apparatus pressing the brake shoes for braking against a brake drum enclosing them and a first automatically clearance compensating adjusting device arranged between the brake shoe ends and a second adjusting device arranged at at least one brake shoe web supporting the brake shoe, wherein a clamping element (52) is slidable in longitudinal direction acts in a friction-type locking and due to the effect of a spring (16) against the margin of said adjusting thrust member (14), which said margin presents a wedge-shaped taper in the direction of expansion of said brake shoe (5) wherein said second adjusting device automatically adjusts the position of said brake shoe web.

27. An apparatus for a drum brake for mechanically actuatable self-energizing internal shoe-type drum brakes for automotive vehicles, with a pair of brake shoes arranged on a brake carrier plate at a thrust member and furnished with tension springs, a mechanical actuating apparatus acting between a pair of brake shoe ends being disposed opposite each other and being prestressed by springs, said mechanical actuating apparatus pressing the brake shoes for braking against a brake drum enclosing them and a first automatically clearance compensating adjusting device arranged between the brake shoe ends and a second adjusting device arranged at at least one brake shoe web supporting the brake shoe, wherein said adjusting member of said second adjusting apparatus at said brake shoe (5) is furnished with a clamping lever (54) loaded by means of a torsion spring (50) and eccentrically secured to said brake shoe web (12) by means of a pin (49), the end surface of the clamping lever (54) being toothed and touching the stop of a rotating segment (53) being eccentrically rotatable on a stationary bearing bolt (55) which is vertically secured on the brake shoe web (12) and provided with an adjusting tension spring (11) secured in an opening (56) of said rotating segment (53).

28. An apparatus for a drum brake for mechanically actuatable self-energizing internal shoe-type drum brakes for automotive vehicles, with a pair of brake shoes arranged on a brake carrier plate at a thrust member and furnished with tension springs, a mechanical actuating apparatus acting between a pair of brake shoe ends being disposed opposite each other and being prestressed by springs, said mechanical actuating apparatus pressing the brake shoes for braking against a brake drum enclosing them and a first automatically clearance compensating adjusting device arranged between the brake shoe ends and a second adjusting device arranged at at least one brake shoe web supporting the brake shoe, wherein under a shortening action of the adjusting tension spring (11), the rotating segment (53) contacts the supporting bracket (2) wherein said second adjusting device automatically adjusts the position of said brake shoe web.

29. An apparatus for a drum brake for mechanically actuatable self-energizing internal shoe-type drum brakes for automotive vehicles, with a pair of brake shoes arranged on a brake carrier plate at a thrust member and furnished with tension springs, a mechanical actuating apparatus acting between a pair of brake shoe ends being disposed opposite each other and being prestressed by springs, said mechanical actuating apparatus pressing the brake shoes for braking against a brake drum enclosing them and a first automatically clearance compensating adjusting device arranged between the brake shoe ends and a second adjusting device arranged at at least one brake shoe web supporting the brake shoe, wherein said adjusting member of said second adjusting apparatus at said brake shoe (5) is furnished with a bushing element (57) which is pivoted on said brake shoe web (12) and presents at least one longitudinal slot and whose buttress thread (60) arranged within the hollow space interacts with a threaded bolt (58) pivotably secured to said rotating segment (53).

30. An apparatus for a drum brake for mechanically actuatable self-energizing internal shoe-type drum brakes for automotive vehicles, with a pair of brake shoes arranged on a brake carrier plate at a thrust member and furnished with tension springs, a mechanical actuating apparatus acting between a pair of brake shoe ends being disposed opposite each other and being prestressed by springs, said mechanical actuating apparatus pressing the brake shoes for braking against a brake drum enclosing them and a first automatically clearance compensating adjusting device arranged between the brake shoe ends and a second adjusting device arranged at at least one brake shoe web supporting the brake shoe, wherein said apparatus is comprised of an adjusting unit consisting of a thrust member (6) in a housing (61) with a thrust pin (63) slidably guided in a pressure disc (62), a compression spring (64) inserted between said pressure disc (62) and an opposite wall in the hollow space of said housing (61) wherein said second adjusting device automatically adjusts the position of said brake shoe web.

* * * * *